United States Patent
Lee et al.

(10) Patent No.: US 12,378,394 B2
(45) Date of Patent: Aug. 5, 2025

(54) THERMOPLASTIC RESIN COMPOSITION AND MOLDED ARTICLE MANUFACTURED THEREFROM

(71) Applicant: LOTTE CHEMICAL CORPORATION, Seoul (KR)

(72) Inventors: Seon Ae Lee, Uiwang-si (KR); Yoen Kyoung Kim, Uiwang-si (KR); Jee Kwon Park, Uiwang-si (KR); Hyeon Mun Jeong, Uiwang-si (KR)

(73) Assignee: Lotte Chemical Corporation, Seoul (KR)

(*) Notice: Subject to any disclaimer, the term of this patent is extended or adjusted under 35 U.S.C. 154(b) by 763 days.

(21) Appl. No.: 17/771,572

(22) PCT Filed: Nov. 18, 2020

(86) PCT No.: PCT/KR2020/016286
§ 371 (c)(1),
(2) Date: Apr. 25, 2022

(87) PCT Pub. No.: WO2021/107489
PCT Pub. Date: Jun. 3, 2021

(65) Prior Publication Data
US 2022/0411616 A1    Dec. 29, 2022

(30) Foreign Application Priority Data
Nov. 29, 2019 (KR) .................. 10-2019-0156269

(51) Int. Cl.
*C08L 23/12* (2006.01)
*B29C 45/00* (2006.01)
*B29K 23/00* (2006.01)
*C08K 3/34* (2006.01)
*C08L 23/16* (2006.01)
*C08L 53/00* (2006.01)

(52) U.S. Cl.
CPC .......... *C08L 23/12* (2013.01); *B29C 45/0001* (2013.01); *C08K 3/34* (2013.01); *C08L 23/16* (2013.01); *C08L 53/00* (2013.01); *B29K 2023/12* (2013.01); *B29K 2023/16* (2013.01)

(58) Field of Classification Search
None
See application file for complete search history.

(56) References Cited

U.S. PATENT DOCUMENTS

| | | | | |
|---|---|---|---|---|
| 4,530,134 A | * | 7/1985 | Hosel | D01G 23/06 19/106 R |
| 5,153,249 A | * | 10/1992 | Yokote | C08K 5/1575 524/451 |
| 5,258,150 A | * | 11/1993 | Merkel | C04B 35/64 264/43 |
| 6,562,886 B1 | * | 5/2003 | Minami | C08J 5/18 525/240 |
| 2014/0364569 A1 | * | 12/2014 | Kito | C08L 77/06 525/183 |
| 2019/0291393 A1 | | 9/2019 | Solenicki et al. | |
| 2020/0385571 A1 | | 12/2020 | Woo et al. | |
| 2022/0267572 A1 | * | 8/2022 | Iwasaki | B32B 25/18 |

FOREIGN PATENT DOCUMENTS

| | | | |
|---|---|---|---|
| CN | 104129793 A | * | 11/2014 |
| CN | 104817764 A | | 8/2015 |
| CN | 108676257 A | | 10/2018 |
| JP | 2005-200614 A | | 7/2005 |
| JP | 2012-229303 A | | 11/2012 |
| JP | 2017-137404 A | | 8/2017 |
| KR | 10-2010-0027316 A1 | | 3/2010 |
| KR | 10-2014-0105826 A | | 9/2014 |
| KR | 10-2016-0135899 A | | 11/2016 |
| KR | 10-1863421 B1 | | 5/2018 |
| KR | 10-2019-0040072 A | | 4/2019 |
| KR | 10-2019-0082072 A1 | | 7/2019 |
| WO | 2021/107489 A1 | | 6/2021 |

OTHER PUBLICATIONS

CN104129793A English Machine Translation, prepared Apr. 9, 2025. (Year: 2025).*
International Search Report in counterpart International Application No. PCT/KR2020/016286 dated Feb. 25, 2021, pp. 1-6.
Extended Search Report in counterpart European Application No. 20891925.8 dated Nov. 8, 2023, pp. 1-3.

* cited by examiner

*Primary Examiner* — Christopher M Rodd
(74) *Attorney, Agent, or Firm* — Additon, Pendleton & Witherspoon, P.A.

(57) ABSTRACT

A thermoplastic resin composition of the present invention is characterized by comprising: about 100 parts by weight of a polyolefin resin including one or more of a polypropylene resin and an ethylene-propylene block copolymer; about 10 parts by weight to about 60 parts by weight of a phosphorus nitrogen-based flame retardant; about 0.05 parts by weight to about 10 parts by weight of a maleic anhydride-modified olefin-based polymer; and about 5 parts by weight to about 40 parts by weight of talc having a calcium content of about 0.1% by weight or less. The thermoplastic resin composition has excellent flame retardancy, impact resistance, rigidity, molding processability, etc.

13 Claims, No Drawings

THERMOPLASTIC RESIN COMPOSITION AND MOLDED ARTICLE MANUFACTURED THEREFROM

CROSS-REFERENCE TO RELATED APPLICATIONS

This application claims priority to and the benefit of International Application No. PCT/KR2020/016286, filed Nov. 18, 2020, which published as WO 2021/107489 on Jun. 3, 2021, and Korean Patent Application No. 10-2019-0156269, filed in the Korean Intellectual Property Office on Nov. 29, 2019, the entire disclosure of each of which is incorporated herein by reference.

TECHNICAL FIELD

The present invention relates to a thermoplastic resin composition and a molded article produced therefrom. More particularly, the present invention relates to a thermoplastic resin composition that exhibits good properties in terms of flame retardancy, impact resistance, rigidity, molding processability, and the like, and a molded article produced therefrom.

BACKGROUND ART

A polypropylene resin has good properties in terms of chemical resistance, weather resistance, and processability to be easily produced into injection-molded articles, films, and blow-molded articles and is widely applied to automobiles, building materials, electric parts, and the like.

Since the polypropylene resin is flammable due to the chemical structure thereof, various organic or inorganic flame retardants are added together in order to impart flame retardancy. However, with increasing interest in environmental issues, regulations on existing halogen-based flame retardants have been gradually strengthened. Thus, there is a need for reduction or exclusion of the halogen-based flame retardants in order to use thermoplastic resin compositions as eco-friendly materials.

However, thermoplastic resin compositions prepared using a non-halogen based flame retardant alone have a problem of significant deterioration in flame retardancy, as compared to thermoplastic resin compositions prepared using a halogen-based flame retardant.

Moreover, when the non-halogen based flame retardant is used together with inorganic fillers, such as talc and the like, for improvement in flame retardancy and mechanical properties of an olefin-based thermoplastic resin composition, the thermoplastic resin composition can suffer from deterioration in molding processability and the like due to generation of bubbles.

Therefore, there is a need for development of a thermoplastic resin composition that exhibits good properties in terms of flame retardancy, impact resistance, rigidity, molding processability, and balance therebetween.

The background technique of the present invention is disclosed in Korean Patent Registration No. 10-1863421 and the like.

DISCLOSURE

Technical Problem

It is one object of the present invention to provide a thermoplastic resin composition having good properties in terms of flame retardancy, impact resistance, rigidity, molding processability, and the like.

It is another object of the present invention to provide a molded article produced from the thermoplastic resin composition.

The above and other objects of the present invention can be achieved by the present invention described below.

Technical Solution

1. One aspect of the present invention relates to a thermoplastic resin composition. The thermoplastic resin composition comprises: about 100 parts by weight of a polyolefin resin comprising at least one of a polypropylene resin and an ethylene-propylene block copolymer; about 10 parts by weight to about 60 parts by weight of a phosphorus nitrogen-based flame retardant; about 0.05 parts by weight to about 10 parts by weight of a maleic anhydride-modified olefin polymer; and about 5 parts by weight to about 40 parts by weight of talc having a calcium content of about 0.1 wt % or less.

2. In embodiment 1, the ethylene-propylene block copolymer may comprise about 20% by weight (wt %) to about 60 wt % of ethylene and about 40 wt % to about 80 wt % of propylene.

3. In embodiment 1 or 2, the ethylene-propylene block copolymer may comprise about 60 wt % to about 95 wt % of a propylene homopolymer and about 5 wt % to about 40 wt % of a rubbery ethylene-propylene copolymer.

4. In embodiments 1 to 3, the ethylene-propylene block copolymer may have a melt-flow index (MI) of about 5 g/10 min to about 100 g/10 min, as measured under conditions of 230° C. and 2.16 kgf in accordance with ASTM D1238.

5. In embodiments 1 to 4, the phosphorus nitrogen-based flame retardant may comprise at least one of melamine polyphosphate, melam pyrophosphate, melem pyrophosphate, melon pyrophosphate, melamine pyrophosphate, dimelamine pyrophosphate, melam polyphosphate, melon polyphosphate, melem polyphosphate, ammonium hydrogen phosphate, ammonium dihydrogen phosphate, and ammonium polyphosphate.

6. In embodiments 1 to 5, the maleic anhydride-modified olefin copolymer may be obtained through graft polymerization of maleic anhydride to an alkylene homopolymer or an alkylene-α-olefin copolymer.

7. In embodiments 1 to 6, the talc may have a calcium content of about 0.01 wt % to about 0.07 wt %.

8. In embodiments 1 to 7, the phosphorus nitrogen-based flame retardant and the maleic anhydride-modified olefin polymer may be present in a weight ratio of about 1:1 to about 40:1.

9. In embodiments 1 to 8, the phosphorus nitrogen-based flame retardant and the talc may be present in a weight ratio of about 0.3:1 to about 8:1.

10. In embodiments 1 to 10, the thermoplastic resin composition may have a flame retardancy of V-0, as measured on a 2.5 mm thick injection-molded specimen in accordance with a UL-94 vertical test method, and a flame retardancy of 5VA, as measured on a 1.5 mm thick injection-molded specimen in accordance with a UL-94 5A vertical burning test method.

11. In embodiments 1 to 10, the thermoplastic resin composition may have a notched Izod impact strength of about 3 kgf·cm/cm to about 20 kgf·cm/cm, as measured on a ⅛" mm thick specimen in accordance with ASTM D256.

12. In embodiments 1 to 11, the thermoplastic resin composition may have a flexural strength of about 18,000 kgf/cm² to about 35,000 kgf/cm², as measured on a 3.2 mm thick specimen at a speed of 2.8 mm/min in accordance with ASTM D790.

13. Another aspect of the present invention relates to a molded article. The molded article is produced from the thermoplastic resin composition according to any one of embodiments 1 to 12.

Advantageous Effects

The present invention provides a thermoplastic resin composition having good properties in terms of flame retardancy, impact resistance, rigidity, molding processability, and the like, and a molded article produced therefrom.

BEST MODE

Hereinafter, embodiments of the present invention will be described in detail.

A thermoplastic resin composition according to the present invention comprises: (A) a polyolefin resin; (B) a phosphorus nitrogen-based flame retardant; (C) a maleic anhydride-modified olefin polymer; and (D) talc.

As used herein to represent a specific numerical range, the expression "a to b" means "≥a and ≤b".

(A) Polyolefin Resin

The polyolefin resin according to the present invention comprises at least one of (A1) a polypropylene resin and (A2) an ethylene-propylene block copolymer. For example, the polyolefin resin may be a polypropylene resin or a mixture of a polypropylene resin and an ethylene-propylene block copolymer.

(A1) Polypropylene Resin

According to one embodiment, the polypropylene resin may be a polypropylene resin (propylene homopolymer) used in a typical thermoplastic resin composition.

In some embodiments, the polypropylene resin may have a weight average molecular weight (Mw) of about 10,000 g/mol to about 400,000 g/mol, for example, about 15,000 g/mol to about 350,000 g/mol, as measured by gel permeation chromatography (GPC). Within this range, the thermoplastic resin composition can have good mechanical strength, molding processability, and the like.

In some embodiments, the polypropylene resin may have a melt-flow index (MI) of about 5 g/10 min to about 100 g/10 min, for example, about 5 g/10 min to about 70 g/10 min, as measured under conditions of 230° C. and 2.16 kgf in accordance with ASTM D1238. Within this range, the thermoplastic resin composition can have mechanical strength, molding processability, and the like.

In some embodiments, the polypropylene resin may be present in an amount of about 20 wt % to about 100 wt %, for example, about 40 wt % to about 100 wt %, based on 100 wt % of the polyolefin resin. Within this range, the thermoplastic resin composition can exhibit good properties in terms of impact resistance, rigidity, flame retardancy, molding processability, and the like.

(A2) Ethylene-Propylene Block Copolymer

According to the present invention, the ethylene-propylene block copolymer serves to improve impact resistance, rigidity, molding processability and the like of the thermoplastic resin composition, and may be selected from any ethylene-propylene block copolymers (block polypropylene) for typical thermoplastic resin compositions. For example, the ethylene-propylene block copolymer may be obtained through sequential polymerization of a propylene homopolymerization part and an ethylene-propylene copolymerization part in a reactor.

In some embodiments, the ethylene-propylene block copolymer may comprise about 20 wt % to about 60 wt %, for example, about 30 wt % to about 50 wt %, of ethylene and about 40 wt % to about 80 wt %, for example, about 50 wt % to about 70 wt %, of propylene. Within this range, the thermoplastic resin composition can have good moldability, good impact resistance, and the like.

In some embodiments, the ethylene-propylene block copolymer may comprise about 60 wt % to about 95 wt %, for example, about 70 wt % to about 90 wt %, of a propylene homopolymer, which is present in a continuous phase (matrix), and about 5 wt % to about 40 wt %, for example, about 10 wt % to about 30 wt %, of an ethylene-propylene copolymer, which is a rubber component present in a dispersed phase. Within this range, the thermoplastic resin composition can have good rigidity, impact resistance, and the like.

In some embodiments, the ethylene-propylene block copolymer may have a melt-flow index (MI) of about 1 g/10 min to about 130 g/10 min, for example, about 5 g/10 min to about 100 g/10 min, as measured under conditions of 230° C. and 2.16 kgf in accordance with ASTM D1238. Within this range, the thermoplastic resin composition can have good impact resistance and the like.

In some embodiments, the ethylene-propylene block copolymer may be present in an amount of about 80 wt % or less, for example, about 60 wt % or less, based on 100 wt % of the polyolefin resin. Within this range, the thermoplastic resin composition can exhibit good properties in terms of impact resistance, rigidity, flame retardancy, molding processability, and the like.

(B) Phosphorus Nitrogen-Based Flame Retardant

According to the present invention, the phosphorus nitrogen-based flame retardant serves to improve flame retardancy, rigidity, molding processability and the like of the olefin-based thermoplastic resin composition even with a small amount together with the maleic anhydride-modified olefin polymer and a particular kind of talc, and may be selected from any phosphorus nitrogen-based flame retardants for typical thermoplastic resin compositions.

In some embodiments, the phosphorus nitrogen-based flame retardant may comprise at least one of melamine polyphosphate, melam pyrophosphate, melem pyrophosphate, melon pyrophosphate, melamine pyrophosphate, dimelamine pyrophosphate, melam polyphosphate, melon polyphosphate, melem polyphosphate, ammonium hydrogen phosphate, ammonium dihydrogen phosphate, ammonium polyphosphate, combinations thereof, and mixed multi-salts thereof. For example, the phosphorus nitrogen-based flame retardant may comprise melamine polyphosphate, ammonium polyphosphate, and the like.

In some embodiments, the phosphorus nitrogen-based flame retardant may be present in an amount of about 10 parts by weight to about 60 parts by weight, for example, about 20 part by weight to about 50 parts by weight, relative to about 100 parts by weight of the polyolefin resin. If the content of the phosphorus nitrogen-based flame retardant is less than about 10 parts by weight relative to about 100 parts by weight of the polyolefin resin, the thermoplastic resin composition can suffer from deterioration in flame retardancy and the like, and if the content of the phosphorus nitrogen-based flame retardant exceeds about 60 parts by weight, the thermoplastic resin composition can suffer from deterioration in impact resistance, molding processability, and the like.

(C) Maleic Anhydride-Modified Olefin Polymer

According to the present invention, the maleic anhydride-modified olefin polymer serves to improve compatibility, flame retardancy, impact resistance, rigidity and the like of the olefin-based thermoplastic resin composition even with a small amount together with the polyolefin resin, the phosphorus nitrogen-based flame retardant and a particular kind of talc, and may be a maleic anhydride-modified olefin polymer obtained through graft polymerization of maleic anhydride to an alkylene homopolymer or an alkylene-α-olefin copolymer.

In some embodiments, the alkylene monomer may be a $C_2$ to $C_{10}$ alkylene, and may be selected from among, for example, ethylene, propylene, iso-propylene (this doesn't exist), butylene, isobutylene, octene, and combinations thereof.

In some embodiments, the maleic anhydride-modified olefin polymer may comprise a maleic anhydride-modified propylene homopolymer, a maleic anhydride-modified ethylene-propylene copolymer, a maleic anhydride-modified propylene-1-octene copolymer, and the like.

In some embodiments, the maleic anhydride-modified olefin copolymer may have a melt-flow index (MI) of about 50 g/10 min to about 300 g/10 min, for example, about 80 g/10 min to about 120 g/10 min, as measured under conditions of 230° C. and 2.16 kgf in accordance with ASTM D1238.

In some embodiments, the maleic anhydride-modified olefin polymer may be present in an amount of about 0.05 parts by weight to about 10 parts by weight, for example, about 0.08 to about 9 parts by weight, relative to about 100 parts by weight of the polyolefin resin. If the content of the maleic anhydride-modified olefin polymer is less than about 0.05 parts by weight relative to about 100 parts by weight of the polyolefin resin, the thermoplastic resin composition can suffer from deterioration in rigidity, impact resistance, and the like, and if the content of the maleic anhydride-modified olefin polymer exceeds about 10 parts by weight, the thermoplastic resin composition can suffer from deterioration in molding processability and the like.

In some embodiments, the phosphorus nitrogen-based flame retardant (B) and the maleic anhydride-modified olefin polymer (C) may be present in a weight ratio (B:C) of about 1:1 to about 40:1, for example, about 3:1 to about 30:1. Within this range, the thermoplastic resin composition can exhibit good flame retardancy, compatibility, and the like.

(D) Talc

According to the present invention, talc serves to reduce a shrinkage rate of the olefin-based thermoplastic resin composition while improving molding processability, rigidity, flame retardancy, and the like together with the polyolefin resin, the phosphorus nitrogen-based flame retardant, and the like. Talc may have a calcium content of about 0.1 wt % or less, for example, about 0.01 wt % to about 0.07 wt %, based on 100 wt % of talc. If the calcium content of the talc exceeds about 0.1 wt %, the thermoplastic resin composition can suffer from deterioration in molding processability and the like due to generation of bubbles.

In some embodiments, the talc may have an average particle diameter (D40, a particle diameter at a distribution rate of 50%) of about 1 μm to about 100 μm, for example, about 5 μm to about 25 μm, as measured using a particle analyzer. Within this range, the thermoplastic resin composition can exhibit good properties in terms of flame retardancy, molding processability, and the like.

In some embodiments, the talc may be present in an amount of about 5 parts by weight to about 40 parts by weight, for example, about 6 to about 39 parts by weight, specifically about 15 to about 30 parts by weight, relative to about 100 parts by weight of the polyolefin resin. If the content of the talc is less than about 5 parts by weight relative to about 100 parts by weight of the polyolefin resin, the thermoplastic resin composition can suffer from increase in shrinkage and deterioration in rigidity, flame retardancy, and the like, and if the content of the talc exceeds about 40 parts by weight, the thermoplastic resin composition can suffer from deterioration in flame retardancy, molding processability, and the like.

In some embodiments, the phosphorus nitrogen-based flame retardant (B) and the talc (D) may be present in an amount (B:D) of about 0.3:1 to about 8:1, for example, about 0.5:1 to about 6:1. Within this range, the thermoplastic resin composition can exhibit good flame retardancy and the like.

In some embodiments, the maleic anhydride-modified olefin polymer (C) and the talc (D) may be present in an amount (C:D) of about 1:1 to about 1:30, for example, about 1:2 to about 1:20. Within this range, the thermoplastic resin composition can exhibit better compatibility, mechanical properties, and the like.

According to one embodiment, the thermoplastic resin composition may further comprise additives for typical thermoplastic resin compositions. Examples of the additives may comprise antioxidants, anti-dripping agents, lubricants, release agents, nucleating agents, antistatic agents, stabilizers, pigments, dyes, and mixtures thereof, without being limited thereto. The additives may be present in an amount of about 0.001 parts by weight to about 40 parts by weight, for example, about 0.1 parts by weight to about 5 parts by weight, relative to about 100 parts by weight of the polyolefin resin.

The thermoplastic resin composition according to one embodiment may be prepared in pellet form by mixing the aforementioned components, followed by melt extrusion at about 120° C. to about 280° C., for example, about 180° C. to about 220° C., using a typical twin-screw extruder.

In some embodiments, the thermoplastic resin composition may have a flame retardancy of V-0, as measured on a 2.5 mm thick injection-molded specimen in accordance with a UL-94 vertical test method, and a flame retardancy of 5VA, as measured on a 1.5 mm thick injection-molded specimen in accordance with a UL-94 5V vertical burning test method.

In some embodiments, the thermoplastic resin composition may have a notched Izod impact strength of about 3 kgf·cm/cm to about 20 kgf·cm/cm, for example, about 4 kgf·cm/cm to about 18 kgf·cm/cm, as measured on a ⅛" thick specimen in accordance with ASTM D256.

In some embodiments, the thermoplastic resin composition may have a flexural strength of about 18,000 kgf/cm$^2$ to about 35,000 kgf/cm$^2$, for example, about 20,000 kgf/cm$^2$ to about 30,000 kgf/cm$^2$, as measured on a 3.2 mm thick specimen at a speed of 2.8 mm/min in accordance with ASTM D790.

A molded article according to the present invention is produced from the thermoplastic resin composition as set forth above. The thermoplastic resin composition may be prepared in pellet form. The prepared pellets may be produced into various molded articles (products) by various molding methods, such as injection molding, extrusion molding, vacuum molding, and casting. These molding methods are well known to those skilled in the art. The molded article has good properties in terms of flame retardancy, impact resistance, rigidity, molding processability, and balance therebetween, and thus can be advantageously used in interior/exterior materials of electric/electronic products, interior materials of home appliances, and the like.

MODE FOR INVENTION

Next, the present invention will be described in more detail with reference to some examples. It should be understood that these examples are provided for illustration only and are not to be construed in any way as limiting the invention.

EXAMPLE

Details of components used in Examples and Comparative Examples are as follows.
  (A) Polyolefin resin
  (A1) Polypropylene resin
  A polypropylene resin (Manufacturer: Lotte Chemical Co., Ltd., Product Name: H1500, Melt-flow index (MI): 12 g/10 min) was used.
  (A2) Ethylene-propylene block copolymer
  An ethylene-propylene block copolymer (Manufacturer: Lotte Chemical Co., Ltd., Product Name: JH370A, Melt-flow index (MI): 28 g/10 min) was used.
  (B) Flame retardant
    (B1) A melamine polyphosphate flame retardant (Manufacturer: Sunris, Product Name: SR202) was used as a phosphorus nitrogen-based flame retardant.
    (B2) A bisphenol A diphosphate (Manufacturer: DAIHACHI, Product Name: CR-741) was used as a phosphorus flame retardant.
  (C) Maleic anhydride-modified olefin copolymer
  A maleic anhydride-modified propylene homopolymer (MAH-g-PP, Manufacturer: Chmko, Product Name: MP600PP, melt-flow Index (MI): 110 g/10 min) was used.
  (D) Talc
    (D1) Talc having a calcium content of 0.02 wt % was prepared through surface treatment of commercially available talc. 50 g of talc (Manufacturer: Imerys, Product Name: ST30) was stirred in 307 g of an aqueous solution of 2.3% sulfuric acid for 1 hour, neutralized with water, and dried in an oven at 80° C. for 15 hours. After surface treatment, it was confirmed that the talc had a calcium content of 0.02 wt % through ICP inorganic analysis.
    (D2) Talc having a calcium content of 0.13 wt % (Manufacturer: Imerys, Product Name: ST30) was used.
  (E) Wollastonite (Manufacturer: NYCO, Product Name: NYGLOS) was used.

Examples 1 to 9 and Comparative Examples 1 to 9

The above components were mixed in amounts as listed in Tables 2, 3, 4 and 5, and subjected to extrusion at 200° C., thereby preparing pellets. Here, extrusion was performed using a twin-screw extruder (L/D=36, Φ: 45 mm) and the prepared pellets were dried at 80° C. for 4 hours or more and injection-molded in a 6 oz. injection molding machine (molding temperature: 260° C., mold temperature: 60° C.), thereby preparing specimens. The specimens were evaluated as to the following properties by the following methods and results are shown in Tables 2, 3, 4 and 5.
Property Evaluation
  (1) Flame retardancy: Flame retardancy was measured on a 2.5 mm thick injection-molded specimen in accordance with the UL-94 vertical test method and on a 1.5 mm thick injection-molded specimen in accordance with the UL-94 5A vertical burning test method.
  (2) Notched Izod impact strength (kgf·cm/cm): Notched Izod impact strength was measured on a ⅛" thick specimen in accordance with ASTM D256.
  (3) Flexural strength (unit: kgf/cm$^2$): Flexural strength was measured on a 3.2 mm thick specimen at a speed of 2.8 mm/min in accordance with ASTM D790.
  (4) Molding processability: Molding processability (expansion level) was evaluated through observation of the thermoplastic resin composition pellets prepared in Examples and Comparative Examples with the naked eye. Evaluation criteria are shown in Table 1.

TABLE 1

| \multicolumn{3}{c}{Evaluation standard for molding processability} | | |
|---|---|---|
| ○ | Δ | x (Extrusion was failed) |
| Normal | Although extrusion/injection was allowed, slight expansion occurred | Generation of strands was failed due to severe expansion upon extrusion |

TABLE 2

| | Example | | | | |
|---|---|---|---|---|---|
| | 1 | 2 | 3 | 4 | 5 |
| (A1) (wt %) | 100 | 80 | 40 | 80 | 80 |
| (A2) (wt %) | — | 20 | 60 | 20 | 20 |
| (B1) (parts by weight) | 35 | 35 | 35 | 20 | 50 |
| (B2) (parts by weight) | — | — | — | — | — |
| (C) (parts by weight) | 2 | 2 | 2 | 2 | 2 |
| (D1) (parts by weight) | 25 | 25 | 25 | 25 | 25 |
| (D2) (parts by weight) | — | — | — | — | — |
| (E) (parts by weight) | — | — | — | — | — |
| Flame retardancy (2.5 mm) | V-0 | V-0 | V-0 | V-0 | V-0 |
| Flame retardancy 5VA (1.5 mm) | Pass | Pass | Pass | Pass | Pass |
| Notched Izod impact strength (kgf · cm/cm) | 4 | 10 | 16 | 10 | 4 |
| Flexural strength | 27,000 | 27,000 | 20,000 | 25,000 | 27,000 |
| Molding processability | ○ | ○ | ○ | ○ | ○ |

*parts by weight: parts by weight relative to 100 parts by weight of (A) polyolefin resin (A1 + A2)

TABLE 3

| | Example | | | |
|---|---|---|---|---|
| | 6 | 7 | 8 | 9 |
| (A1) (wt %) | 80 | 80 | 80 | 80 |
| (A2) (wt %) | 20 | 20 | 20 | 20 |
| (B1) (parts by weight) | 35 | 35 | 35 | 35 |
| (B2) (parts by weight) | — | — | — | — |
| (C) (parts by weight) | 0.08 | 9 | 2 | 2 |
| (D1) (parts by weight) | 25 | 25 | 6 | 39 |
| (D2) (parts by weight) | — | — | — | — |
| (E) (parts by weight) | — | — | — | — |
| Flame retardancy (2.5 mm) | V-0 | V-0 | V-0 | V-0 |
| Flame retardancy 5VA (1.5 mm) | Pass | Pass | Pass | Pass |
| Notched Izod impact strength (kgf · cm/cm) | 4 | 12 | 10 | 10 |
| Flexural strength | 20,000 | 29,000 | 20,000 | 29,000 |
| Molding processability | ○ | ○ | ○ | ○ |

*parts by weight: parts by weight relative to 100 parts by weight of (A) polyolefin resin (A1 + A2)

TABLE 4

| | Comparative Example | | | | |
|---|---|---|---|---|---|
| | 1 | 2 | 3 | 4 | 5 |
| (A1) (wt %) | 80 | 80 | 80 | 80 | 80 |
| (A2) (wt %) | 20 | 20 | 20 | 20 | 20 |
| (B1) (parts by weight) | 9 | 65 | — | 35 | 35 |
| (B2) (parts by weight) | — | — | 35 | — | — |
| (C) (parts by weight) | 2 | 2 | 2 | 0.04 | 12 |
| (D1) (parts by weight) | 25 | 25 | 25 | 25 | 25 |
| (D2) (parts by weight) | — | — | — | — | — |
| (E) (parts by weight) | — | — | — | — | — |
| Flame retardancy (2.5 mm) | Fail | V-0 | Fail | V-0 | V-0 |
| Flame retardancy 5VA (1.5 mm) | Fail | Pass | Fail | Pass | Fail |
| Notched Izod impact strength (kgf · cm/cm) | 10 | 1 | 10 | 1 | 13 |
| Flexural strength | 20,000 | 27,000 | 20,000 | 15,000 | 30,000 |
| Molding processability | ○ | △ | △ | ○ | △ |

*parts by weight: parts by weight relative to 100 parts by weight of (A) polyolefin resin (A1 + A2)

TABLE 5

| | Comparative Example | | | |
|---|---|---|---|---|
| | 6 | 7 | 8 | 9 |
| (A1) (wt %) | 80 | 80 | 80 | 80 |
| (A2) (wt %) | 20 | 20 | 20 | 20 |
| (B1) (parts by weight) | 35 | 35 | 35 | 35 |
| (B2) (parts by weight) | — | — | — | — |
| (C) (parts by weight) | 2 | 2 | 2 | 2 |
| (D1) (parts by weight) | 4 | 41 | — | — |
| (D2) (parts by weight) | — | — | 25 | — |
| (E) (parts by weight) | — | — | — | 25 |
| Flame retardancy (2.5 mm) | V-0 | Fail | — | — |
| Flame retardancy 5VA (1.5 mm) | Fail | Pass | — | — |
| Notched Izod impact strength (kgf · cm/cm) | 3 | 7 | — | — |
| Flexural strength | 14,000 | 27,000 | — | — |
| Molding processability | ○ | △ | x | x |

* parts by weight: parts by weight relative to 100 parts by weight of (A) polyolefin resin (A1 + A2)

From the above results, it could be seen that the thermoplastic resin compositions according to the present invention exhibited good properties in terms of flame retardancy flame retardancy, impact resistance, rigidity, molding processability, and the like.

Conversely, it could be seen that the thermoplastic resin composition prepared using an insufficient amount of the phosphorus nitrogen-based flame retardant (Comparative Example 1) suffered from deterioration in flame retardancy and the like; the thermoplastic resin composition prepared using an excess of the phosphorus nitrogen-based flame retardant (Comparative Example 2) suffered from deterioration in impact resistance, molding processability, and the like; and the thermoplastic resin composition prepared using the phosphorus flame retardant (B2) instead of the phosphorus nitrogen-based flame retardant (B1) (Comparative Example 3) suffered from deterioration in flame retardancy, molding processability, and the like. It could be seen that the thermoplastic resin composition prepared using an insufficient amount of the maleic anhydride-modified olefin polymer (Comparative Example 4) suffered from deterioration in impact resistance, rigidity, and the like; and the thermoplastic resin composition prepared using an excess of the maleic anhydride-modified olefin polymer (Comparative Example 5) suffered from deterioration in flame retardancy, molding processability, and the like. In addition, it could be seen that the thermoplastic resin composition prepared using an insufficient amount of talc (Comparative Example 6) suffered from deterioration in flame retardancy, rigidity, and the like; the thermoplastic resin composition prepared using an excess of talc (Comparative Example 7) suffered from deterioration in flame retardancy, molding processability, and the like; and the thermoplastic resin composition prepared using talc (D2) or wollastonite (E) instead of talc (D1) (Comparative Example 8 and 9) was severely expanded upon extrusion and could not be evaluated as to molding processability and properties.

It should be understood that various modifications, changes, alterations, and equivalent embodiments can be made by those skilled in the art without departing from the spirit and scope of the present invention.

The invention claimed is:

1. A thermoplastic resin composition comprising:
   about 100 parts by weight of a polyolefin resin comprising a polypropylene resin and/or an ethylene-propylene block copolymer;
   about 10 parts by weight to about 60 parts by weight of a phosphorus nitrogen-based flame retardant;
   about 0.05 parts by weight to about 10 parts by weight of a maleic anhydride-modified olefin polymer; and
   about 5 parts by weight to about 40 parts by weight of talc having a calcium content of about 0.1 wt % or less.

2. The thermoplastic resin composition according to claim 1, wherein the ethylene-propylene block copolymer comprises about 20 wt % to about 60 wt % of ethylene and about 40 wt % to about 80 wt % of propylene.

3. The thermoplastic resin composition according to claim 1, wherein the ethylene-propylene block copolymer comprises about 60 wt % to about 95 wt % of a propylene homopolymer and about 5 wt % to about 40 wt % of a rubbery ethylene-propylene copolymer.

4. The thermoplastic resin composition according to claim 1, wherein the ethylene-propylene block copolymer has a melt-flow index (MI) of about 5 g/10 min to about 100 g/10 min, as measured under conditions of 230° C. and 2.16 kgf in accordance with ASTM D1238.

5. The thermoplastic resin composition according to claim 1, wherein the phosphorus nitrogen-based flame retardant comprises melamine polyphosphate, melam pyrophosphate, melem pyrophosphate, melon pyrophosphate, melamine pyrophosphate, dimelamine pyrophosphate, melam polyphosphate, melon polyphosphate, melem polyphosphate, ammonium hydrogen phosphate, ammonium dihydrogen phosphate, and/or ammonium polyphosphate.

6. The thermoplastic resin composition according to claim 1, wherein the maleic anhydride-modified olefin copolymer is obtained through graft polymerization of maleic anhydride to an alkylene homopolymer or an alkylene-α-olefin copolymer.

7. The thermoplastic resin composition according to claim 1, wherein the talc has a calcium content of about 0.01 wt % to about 0.07 wt %.

8. The thermoplastic resin composition according to claim 1, wherein the phosphorus nitrogen-based flame retardant and the maleic anhydride-modified olefin polymer are present in a weight ratio of about 1:1 to about 40:1.

9. The thermoplastic resin composition according to claim 1, wherein the phosphorus nitrogen-based flame retardant and the talc are present in a weight ratio of about 0.3:1 to about 8:1.

10. The thermoplastic resin composition according to claim 1, wherein the thermoplastic resin composition has a flame retardancy of V-0, as measured on a 2.5 mm thick injection-molded specimen in accordance with a UL-94 vertical test method, and a flame retardancy of 5VA, as measured on a 1.5 mm thick injection-molded specimen in accordance with a UL-94 5A vertical burning test method.

11. The thermoplastic resin composition according to claim 1, wherein the thermoplastic resin composition has a notched Izod impact strength of about 3 kgf·cm/cm to about 20 kgf·cm/cm, as measured on a ⅛" mm thick specimen in accordance with ASTM D256.

12. The thermoplastic resin composition according to claim 1, wherein the thermoplastic resin composition has a flexural strength of about 18,000 kgf/cm$^2$ to about 35,000 kgf/cm$^2$, as measured on a 3.2 mm thick specimen at a speed of 2.8 mm/min in accordance with ASTM D790.

13. A molded article produced from the thermoplastic resin composition according to claim 1.

\* \* \* \* \*